Dec. 23, 1924.
O. H. JOBSKI
1,520,060
WHEEL
Original Filed June 7, 1920
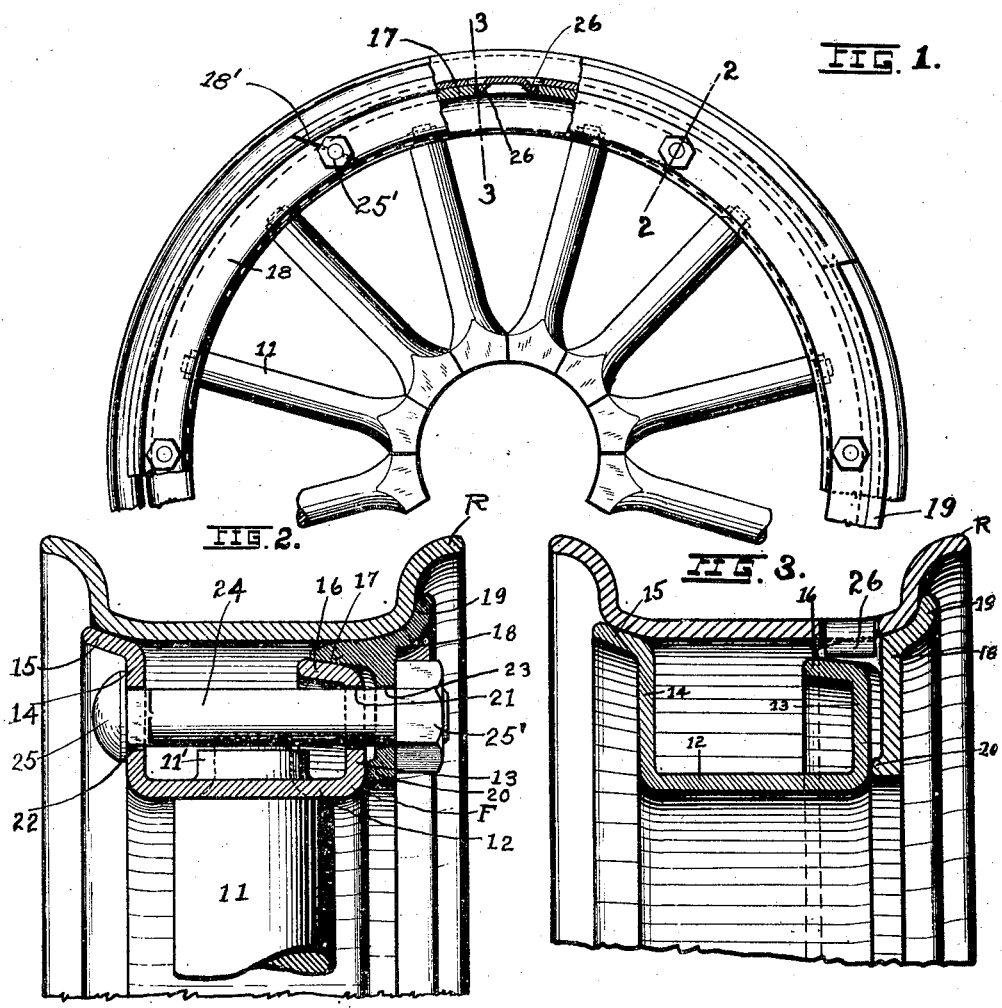
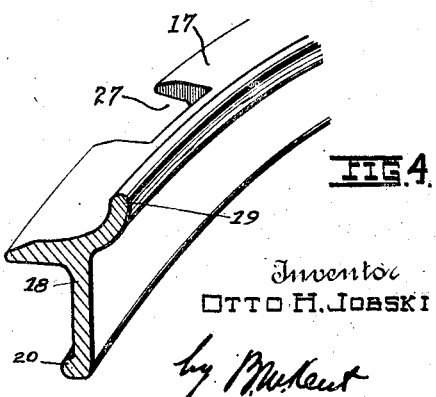
Inventor
OTTO H. JOBSKI
Attorney Patented Dec. 23, 1924.

1,520,060

UNITED STATES PATENT OFFICE.

OTTO H. JOBSKI, OF CLEVELAND, OHIO, ASSIGNOR, BY MESNE ASSIGNMENTS, TO JAMES H. WAGENHORST, OF JACKSON, MICHIGAN.

WHEEL.

Original application filed June 7, 1920, Serial No. 386,962. Divided and this application filed February 2, 1922. Serial No. 533,733.

*To all whom it may concern:*

Be it known that I, OTTO H. JOBSKI, a citizen of the United States, and a resident of Cleveland, county of Cuyahoga, State of Ohio, have invented certain new and useful Improvements in Wheels, of which the following is a specification.

This invention relates to metal fellies for wheels, in which the ordinary wooden felly is dispensed with and has to do particularly with novel means of attaching a demountable rim to such a felly, to prevent turning of the rim thereon.

This application is a division of my earlier application No. 386,962, filed June 7, 1920.

In the accompanying drawings forming a part of this application;

Figure 1 is a side view showing a wheel in which my invention is embodied, a portion being cut away to show the manner in which the driver on the rim coacts with the attaching flange to hold the rim in position;

Fig. 2 is a section on line 2—2 of Fig. 1;

Fig. 3 is a section on line 3—3 of Fig. 1; and

Fig. 4 is a perspective view of a portion of the wedge, showing how the driving slot is formed therein.

In the form of the invention illustrated, the reduced portions 10 of the spokes 11 are inserted in the metal (preferably pressed steel) felly F through openings in the felly. These openings are preferably made by drawing and stamping so that the metal is stamped up about the openings, as indicated at 11'. This felly consists of the middle circumferentially and axially extending portion 12 and the radially extending sides 13 and 14. The side 14 is turned over to form a flange 15, providing a seat for one edge of the demountable rim R. The other side 13 is turned inwardly to form a flange or shoulder 16, forming a seat for the heel 17 of annular member 18. Extending away from the felly and on member 18 is the curved lip 19 which forms a seat for the opposite edge of the rim R. The member 18 is split at one point, as at 18', and bears at its radially inner edge upon the felly side 13, a slight protuberance 20 being, preferably, formed on member 18 adjacent said side. The sides 13 and 14 of the felly are provided at stated intervals with registering openings 21 and 22. Similar openings 23 in member 18 are also provided and arranged to register, respectively, with the pairs of registering openings 21 and 22. Bolts 24, having heads 25 at one end and nuts 25' threaded thereon at the other, are provided, to hold said annular member 18 in place and thereby clamp the rim on the felly. One or more pairs of lugs 26 are stamped out from the metal of the rim and project from the inner side thereof, each of said pairs of lugs projecting into a slot 27 cut in the lip 17 of the annular member 18, as indicated in Figs. 1, 3 and 4, the width of the slot being such as to be snugly fitted by the lugs. Since the two lugs of each pair are stamped out and extend in opposite directions circumferentially and are severed from the rim to provide abrupt axially extending faces, one lug of each pair will, therefore, oppose motion of the rim in one direction while the other lug of each pair will oppose motion in the opposite direction.

It will be apparent, from the above description, that an especially advantageous form of felly is provided, which is light and peculiarly adapted for the attachment of a demountable rim thereon and the annular wedge member causing a uniform clamping pressure to be applied around the extent of the rim.

It is, of course, to be understood that the particular embodiment of the invention illustrated and described is merely a typical embodiment of the invention and that the specific construction is given merely by way of illustration and is not intended to limit the invention to such form, as, obviously, many changes in construction and design may be made without departing from the spirit and scope of my invention, as defined in the appended claims.

Having thus described my invention, what I claim is:

1. In a device of the class described, the combination of a felly, a tire rim mounted thereon and having a pair of lugs stamped up from said rim so as to extend radially inward thereof and oppositely directed circumferentially, and means for clamping said rim on the felly, and including a wedge member extending between said rim and felly, and slotted to receive said pair of lugs.

2. In a device of the class described, the combination of a felly, a tire rim seated thereon and formed with integral stamped up lugs exending radially inward of said rim, said lugs having one edge severed from said rim to form abrupt axially extending faces, and means including a wedge member, between said rim and felly, slotted to engage said faces, to prevent circumferential movement of said rim.

In testimony whereof I affix my signature.

OTTO H. JOBSKI.